United States Patent
Cho

(10) Patent No.: US 12,216,868 B2
(45) Date of Patent: Feb. 4, 2025

(54) INPUT SENSING UNIT AND DISPLAY DEVICE INCLUDING THE SAME

(71) Applicant: SAMSUNG DISPLAY CO., LTD., Yongin-si (KR)

(72) Inventor: Ma Eum Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/427,604

(22) Filed: Jan. 30, 2024

(65) Prior Publication Data

US 2025/0004599 A1    Jan. 2, 2025

(30) Foreign Application Priority Data

Jun. 30, 2023 (KR) .................. 10-2023-0085166

(51) Int. Cl.
*G06F 3/044* (2006.01)
(52) U.S. Cl.
CPC .......... *G06F 3/0442* (2019.05); *G06F 3/0443* (2019.05)
(58) Field of Classification Search
CPC .. G06F 3/04162; G06F 3/0441; G06F 3/0442; G06F 3/0443; G06F 3/0446; G06F 2203/04104; G06F 2203/04106; G06F 3/0412

See application file for complete search history.

(56) References Cited

U.S. PATENT DOCUMENTS

| | | |
|---|---|---|
| 9,105,255 B2 | 8/2015 | Brown et al. |
| 9,639,220 B2 | 5/2017 | Wang |
| 10,146,336 B2 | 12/2018 | Lee et al. |
| 11,327,618 B2 | 5/2022 | Li |
| 11,385,751 B2 | 7/2022 | Bang et al. |
| 11,625,118 B2 | 4/2023 | Kim et al. |
| 11,625,119 B2 | 4/2023 | Park et al. |

FOREIGN PATENT DOCUMENTS

| | | |
|---|---|---|
| KR | 10-2022-0041272 A | 4/2022 |
| KR | 10-2022-0062191 A | 5/2022 |

*Primary Examiner* — Temesghen Ghebretinsae
*Assistant Examiner* — Ivelisse Martinez Quiles
(74) *Attorney, Agent, or Firm* — F. CHAU & ASSOCIATES, LLC

(57) ABSTRACT

An input sensing unit includes a first sensing electrode, a second sensing electrode crossing the first sensing electrode, a first pen-sensing electrode adjacent to the first sensing electrode and crossing the second sensing electrode, and a second pen-sensing electrode adjacent to the second sensing electrode and crossing the first sensing electrode. A first sensing line is electrically connected to the first sensing electrode. A second sensing line is electrically connected to the second sensing electrode via the active area. A first pen-sensing line is electrically connected to the first pen-sensing electrode. A second pen-sensing line is electrically connected to the second pen-sensing electrode via the active area and disposed between the first sensing electrode and the second sensing line in the active area.

20 Claims, 12 Drawing Sheets

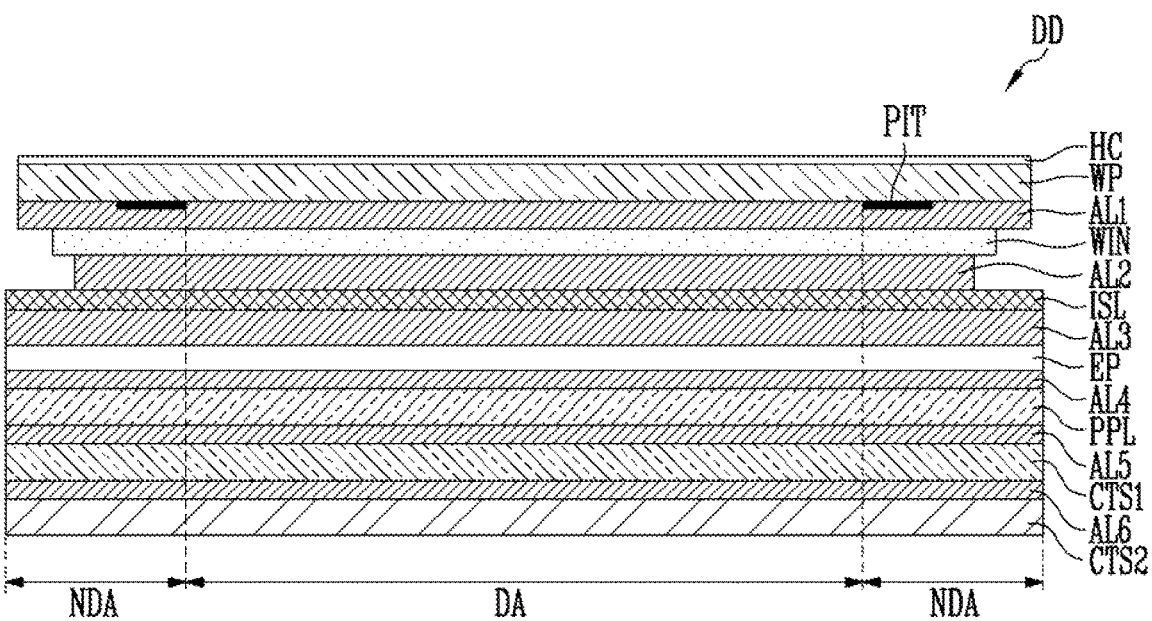
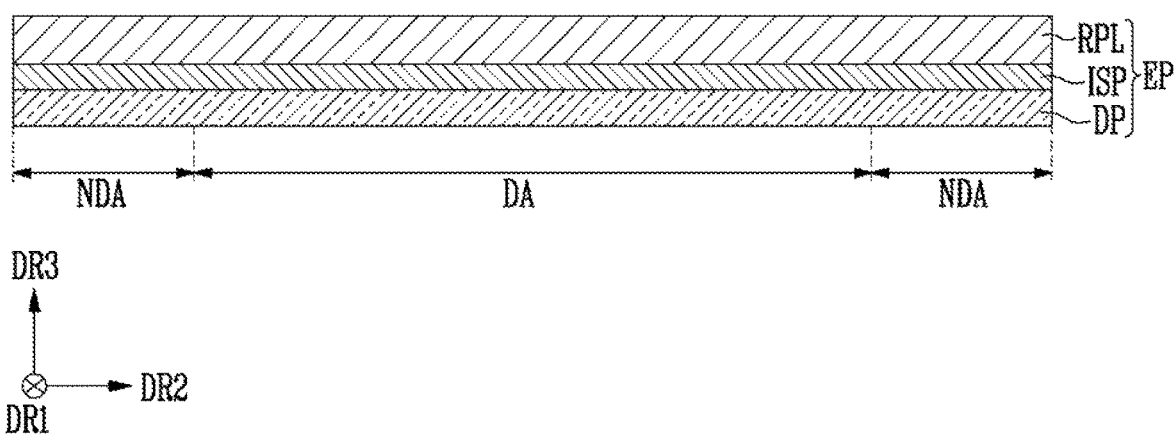

FIG. 5
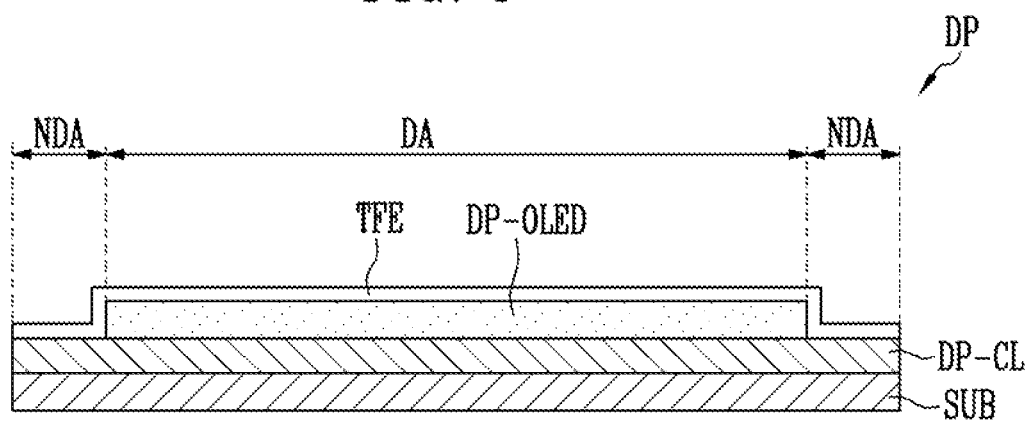
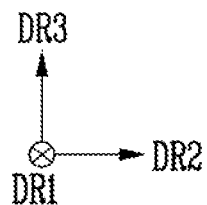

INPUT SENSING UNIT AND DISPLAY DEVICE INCLUDING THE SAME

CROSS-REFERENCE TO RELATED APPLICATION

The application claims priority under 35 U.S.C. § 119 to Korean Patent Application No. 10-2023-0085166, filed Jun. 30, 2023, which is hereby incorporated by reference herein.

TECHNICAL FIELD

The present disclosure relates to display device and, more specifically, to an input sensing unit and a display device including the same.

DISCUSSION OF THE RELATED ART

An electronic device such as a smart phone, a digital camera, a notebook computer, a navigation device, and smart television, that provide an image to a user generally includes a display device for displaying the image. The display device generates an image and provides the image to a user through a display screen.

The display device may include a display panel for displaying an image, a touch panel disposed on the display panel to sense a user's touch, and a digitizer disposed under the display panel to detect a touch by a pen. The digitizer may be implemented in an electromagnetic method (or an electromagnetic resonance method).

The digitizer includes a plurality of coils. When a user moves the pen on the display device, the pen is driven by an AC signal to generate an oscillating magnetic field, which induces a signal in the coils. The position of the pen is detected through reading the signal induced in the coils. The digitizer detects the electromagnetic change caused by the approach of the pen to determine the position of the pen.

However, the use of these two input devices, i.e., the touch panel and the digitizer, may add to the thickness of the display device, which might not be ideal.

SUMMARY

An input sensing unit includes a base layer including an active area and a peripheral area adjacent to the active area. An insulating layer is disposed on the base layer. Sensing electrodes are disposed in the active area and are disposed on the base layer. Lines are disposed on the base layer and are electrically connected to the sensing electrodes. The sensing electrodes includes a first sensing electrode, a second sensing electrode crossing the first sensing electrode, a first pen-sensing electrode adjacent to the first sensing electrode and crossing the second sensing electrode, and a second pen-sensing electrode adjacent to the second sensing electrode and crossing the first sensing electrode. The lines include a first sensing line electrically connected to the first sensing electrode, a second sensing line electrically connected to the second sensing electrode via the active area, a first pen-sensing line electrically connected to the first pen-sensing electrode, and a second pen-sensing line electrically connected to the second pen-sensing electrode via the active area and disposed between the first sensing electrode and the second sensing line in the active area.

A conductive pattern forming the second pen-sensing electrode and a conductive pattern forming the second pen-sensing line may be disposed between a conductive pattern forming the first sensing electrode and a conductive pattern forming the second sensing line.

At least one of conductive patterns forming the second pen-sensing electrode may be electrically connected to ground.

Some of the conductive patterns forming the second pen-sensing electrode, adjacent to the first sensing electrode, may be electrically connected to ground.

The first sensing electrode may include a first portion extending in a first direction, a second portion spaced apart from the first portion of the first sensing electrode and extending in the first direction, and a third portion electrically connecting the first portion of the first sensing electrode and the second portion of the first sensing electrode.

The first pen-sensing electrode may be disposed between the first portion of the first sensing electrode and the second portion of the first sensing electrode.

The sensing electrodes may include first pen-sensing electrodes including the first pen-sensing electrode, and the first pen-sensing electrodes may be electrically connected to each other.

One end of each of the first pen-sensing electrodes may be electrically connected to ground.

The second sensing electrode may extend in a second direction, and the second sensing line may be electrically connected to the second sensing electrode in the active area and may extend in a first direction crossing the second direction in the active area.

The second pen-sensing electrode may at least partially surround the second sensing electrode.

The second pen-sensing electrode may include first portions extending in a second direction and second portions extending in a first direction crossing the second direction and electrically connecting the first portions at both ends of the first portions.

The lines may further include second pen-sensing lines including the second pen-sensing line, and at least two of the second pen-sensing lines may be electrically connected to one of the first portions of the second pen-sensing electrode.

The second sensing line may be disposed between at least two of the second pen-sensing lines in the active area.

A display device includes a display panel and an input sensing unit disposed on the display panel and including an active area and a peripheral area adjacent to the active area. The input sensing unit includes a base layer, an insulating layer disposed on the base layer, sensing electrodes disposed in the active area and disposed on the base layer, and lines disposed on the base layer and electrically connected to the sensing electrodes. The sensing electrodes includes a first sensing electrode, a second sensing electrode crossing the first sensing electrode, a first pen-sensing electrode adjacent to the first sensing electrode and crossing the second sensing electrode, and a second pen-sensing electrode adjacent to the second sensing electrode and crossing the first sensing electrode. The lines include a first sensing line electrically connected to the first sensing electrode, a second sensing line electrically connected to the second sensing electrode via the active area, a first pen-sensing line electrically connected to the first pen-sensing electrode, and a second pen-sensing line electrically connected to the second pen-sensing electrode via the active area and disposed between the first sensing electrode and the second sensing line in the active area.

A conductive pattern forming the second pen-sensing electrode and a conductive pattern forming the second pen-sensing line may be disposed between a conductive pattern forming the first sensing electrode and a conductive pattern forming the second sensing line.

At least one of conductive patterns forming the second pen-sensing electrode may be electrically connected to ground.

Some of the conductive patterns forming the second pen-sensing electrode adjacent to the first sensing electrode may be electrically connected to ground.

The first sensing electrode may include a first portion extending in a first direction, a second portion spaced apart from the first portion of the first sensing electrode and extending in the first direction, and a third portion electrically connecting the first portion of the first sensing electrode and the second portion of the first sensing electrode, and the first pen-sensing electrode may be disposed between the first portion of the first sensing electrode and the second portion of the first sensing electrode.

The sensing electrodes may include first pen-sensing electrodes including the first pen-sensing electrode, the first pen-sensing electrodes may be electrically connected to each other, and one end of each of the first pen-sensing electrodes may be electrically connected to ground.

The second pen-sensing electrode may include first portions extending in a second direction and second portions extending in a first direction crossing the second direction and electrically connecting the first portions at both ends of the first portions. The lines may further include second pen-sensing lines including the second pen-sensing line, at least two of the second pen-sensing lines may be electrically connected to one of the first portions of the second pen-sensing electrode, and the second sensing line may be disposed between at least two of the second pen-sensing lines in the active area.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIG. 3 is a cross-sectional view of the display device according to an embodiment of the present invention.

FIG. 4 is a cross-sectional view illustrating an electronic panel according to an embodiment of the present invention.

FIG. 5 is a cross-sectional view illustrating a display panel according to an embodiment of the present invention.

DETAILED DESCRIPTION OF THE ILLUSTRATED EMBODIMENTS

Figure 1:
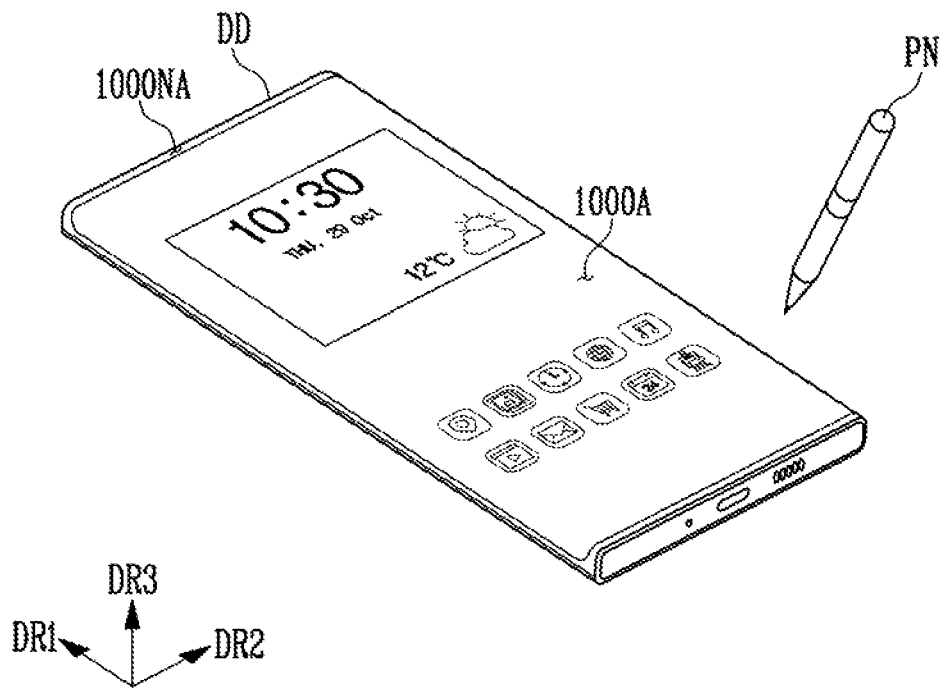
FIG. 1 is a perspective view of a display device according to an embodiment of the present invention.

Hereinafter, embodiments of the present disclosure are described in detail with reference to the accompanying drawings. It should be noted that in the following description, portions necessary for understanding an operation according to the disclosure are described, and descriptions of other portions may be omitted in order not to obscure the subject matter of the disclosure. In addition, the disclosure may be embodied in other forms without necessarily being limited to the embodiment described herein.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not necessary intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not necessarily limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

FIG. 1 is a perspective view of a display device according to an embodiment of the present invention.

Referring to FIG. 1, a display device DD may detect a first input by an input device PN. The display device DD may be a device that is activated according to an electrical signal. For example, the display device DD may be a mobile phone, a tablet, a car navigation system, a game machine, or a wearable device, but the present invention is not necessarily limited thereto. FIG. 1 show a case where the display device DD is a mobile phone as an example.

In the display device DD, an active area 1000A and a peripheral area 1000NA may be defined. The display device DD may display an image through the active area 1000A. The active area 1000A may include a surface defined by a first direction DR1 and a second direction DR2. The peripheral area 1000NA may at least partially surround the periphery of the active area 1000A.

The display device DD may detect inputs applied from outside of the display device DD. The inputs may include various types of external inputs, such as a part of a user's body, light, heat, or pressure. The external inputs may be referred to as a second input.

The display device DD shown in FIG. 1 may detect an input by a user's touch and an input by the input device PN. The input device PN may mean a device other than a user's body. The input by the input device PN may be referred to as a first input. For example, the input device PN may be an active electrostatic (AES) pen, an electro-magnetic resonance (EMR) pen, a stylus pen, a touch pen, or an electronic pen. Hereinafter, a case where the input device PN is an electro-magnetic resonance type pen will be described as an example.

Figure 2:
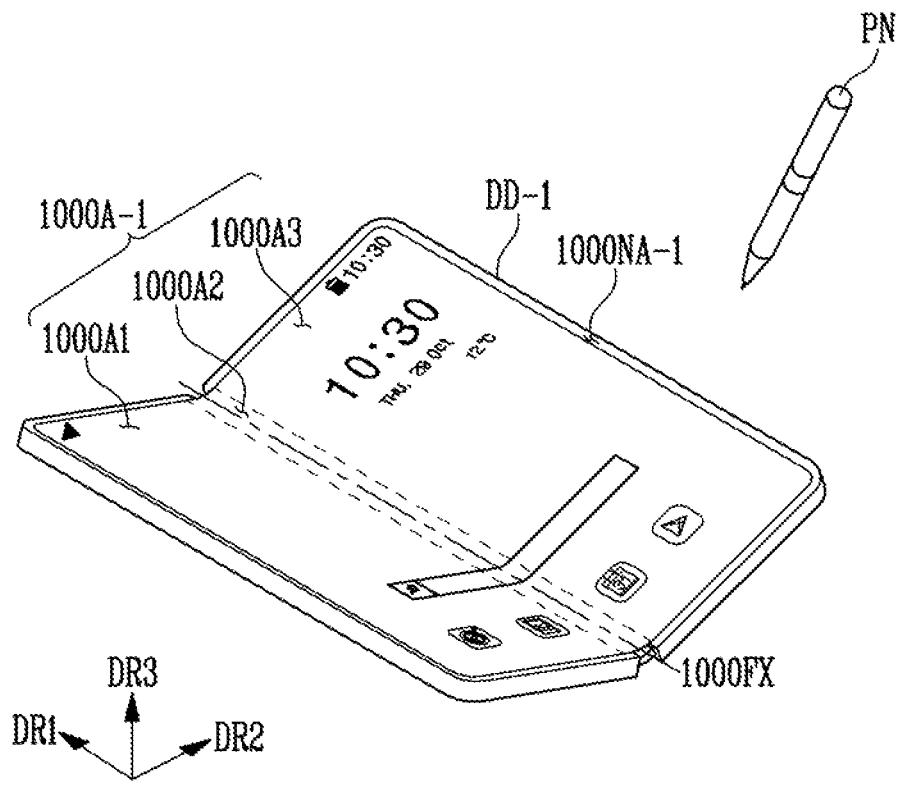
FIG. 2 is a perspective view illustrating a display device according to an embodiment of the present invention.

FIG. 2 is a perspective view illustrating a display device according to an embodiment of the present invention. In describing FIG. 2, the same reference numerals may be used for components described through FIG. 1, and to the extent that an element is not described herein, it may be understood to be at least similar to corresponding elements that have been described elsewhere within the instant disclosure.

FIG. 2 shows a state in which a display device DD-1 is folded at a predetermined angle. Referring to FIG. 2, in an unfolded state of the display device DD-1, an active area 1000A-1 may include a plane defined by the first direction DR1 and the second direction DR2.

The active area 1000A-1 may include a first area 1000A1, a second area 1000A2, and a third area 1000A3. The first area 1000A1, the second area 1000A2, and the third area 1000A3 may be sequentially defined in the second direction DR2. The second area 1000A2 may be bent about a folding axis 1000FX extending along the first direction DR1. Accordingly, the first area 1000A1 and the third area 1000A3 may be referred to as non-folding areas, and the second area 1000A2 may be referred to as a folding area.

When the display device DD-1 is folded, the first area 1000A1 and the third area 1000A3 may face each other. Accordingly, in a completely folded state, the active area 1000A-1 might not be exposed to the outside, which may be referred to as in-folding. However, this is an example and an operation of the display device DD-1 according to an embodiment of the present invention is not necessarily limited thereto.

For example, when the display device DD-1, according to an embodiment of the present invention, is folded, the first area 1000A1 and the third area 1000A3 may face each other. Accordingly, in a folded state, the active area 1000A-1 may be exposed to the outside, which may be referred to as out-folding.

The display device DD-1 may perform either an in-folding operation or an out-folding operation. Alternatively, the display device DD-1 may perform both an in-folding operation and an out-folding operation. In this case, the same area of the display device DD-1, for example, the second area 1000A2, may be alternately in-folded and out-folded.

In FIG. 2, one folding area and two non-folding areas are shown as an example, but the number of folding areas and non-folding areas is not necessarily limited thereto. For example, the display device DD-1 may include a plurality of non-folding areas and a plurality of folding areas disposed between adjacent non-folding areas.

FIG. 2 shows a case in which the folding axis 1000FX extends in the first direction DR1 as an example, but the present invention is not necessarily limited thereto. For example, the folding axis 1000FX may extend in a direction parallel to the second direction DR2. In this case, the first area 1000A1, the second area 1000A2, and the third area 1000A3 may be sequentially arranged along the first direction DR1.

FIG. 3 is a cross-sectional view of the display device according to an embodiment of the present invention.

Referring to FIG. 3, the display device DD may include an electronic panel EP, an impact absorbing layer ISL, a panel protection layer PPL, a first conductive sheet CTS1, a second conductive sheet CTS2, a window WIN, a window protection layer WP, a hard coating layer HC, and first to sixth adhesive layers AL1 to AL6.

The electronic panel EP may display an image, detect the first and second inputs described above, and reduce reflectance of external light. The electronic panel EP may include a display panel, an input sensing unit, and an antireflection layer. The configuration of the electronic panel EP will be described with reference to FIG. 4 below.

The impact absorbing layer ISL may be disposed on the electronic panel EP. The impact absorbing layer ISL may protect the electronic panel EP by absorbing an external impact applied from the top of the display device DD toward the electronic panel EP. The impact absorbing layer ISL may be a stretched film.

The impact absorbing layer ISL may include a flexible plastic material. The flexible plastic material may be a synthetic resin film. For example, the impact absorbing layer ISL may include the flexible plastic material such as polyimide (PI) or polyethylene terephthalate (PET).

The panel protection layer PPL may be disposed under the electronic panel EP. The panel protection layer PPL may protect a lower portion of the electronic panel EP. The panel protection layer PPL may include a flexible plastic material. For example, the panel protection layer PPL may include polyethylene terephthalate (PET).

The first conductive sheet CTS1 may be disposed under the panel protection layer PPL. The second conductive sheet CTS2 may be disposed under the first conductive sheet CTS1. The first conductive sheet CTS1 and the second conductive sheet CTS2 may include metal.

The first conductive sheet CTS1 may include a ferromagnetic material. For example, the first conductive sheet CTS1 may be a ferrite sheet including ferrite. The second conductive sheet CTS2 may include a diamagnetic material. For example, the second conductive sheet CTS2 may include copper. The first and second conductive sheets CTS1 and CTS2 may shield an external magnetic field applied from a lower portion of the display device DD to the electronic panel EP.

The window WIN may be disposed on the impact absorbing layer ISL. The window WIN may protect the electronic panel EP from scratches. The window WIN may have an optically transparent property. The window WIN may include glass. However, the present invention is not necessarily limited thereto, and the window WIN may include a synthetic resin film.

The window WIN may have a multi-layer structure or a single-layer structure. For example, the window WIN may include a plurality of synthetic resin films bonded to each other by an adhesive, or may include a glass substrate and a synthetic resin film bonded to each other by an adhesive.

The window protection layer WP may be disposed on the window WIN. The window protection layer WP may include a flexible plastic material such as polyimide or polyethylene terephthalate. The hard coating layer HC may be disposed on an upper surface of the window protection layer WP.

A printed layer PIT may be disposed on a lower surface of the window protection layer WP. The printed layer PIT may have a black color, but the color of the printed layer PIT is not necessarily limited thereto. The printed layer PIT may be adjacent to an edge of the window protection layer WP. The printed layer PIT may overlap a non-display area NDA.

A first adhesive layer AL1 may be disposed between the window protection layer WP and the window WIN. The window protection layer WP and the window WIN may be bonded to each other by the first adhesive layer AL1. The first adhesive layer AL1 may cover the printed layer PIT.

A second adhesive layer AL2 may be disposed between the window WIN and the impact absorbing layer ISL. The window WIN and the impact absorbing layer ISL may be bonded to each other by the second adhesive layer AL2.

A third adhesive layer AL3 may be disposed between the impact absorbing layer ISL and the electronic panel EP. The impact absorbing layer ISL and the electronic panel EP may be bonded to each other by the third adhesive layer AL3.

A fourth adhesive layer AL4 may be disposed between the electronic panel EP and the panel protection layer PPL. The electronic panel EP and the panel protection layer PPL may be bonded to each other by the fourth adhesive layer AL4.

A fifth adhesive layer AL5 may be disposed between the panel protection layer PPL and the first conductive sheet CTS1. The panel protection layer PPL and the first conductive sheet CTS1 may be bonded to each other by the fifth adhesive layer AL5.

A sixth adhesive layer AL6 may be disposed between the first conductive sheet CTS1 and the second conductive sheet CTS2. The first conductive sheet CTS1 and the second conductive sheet CTS2 may be bonded to each other by the sixth adhesive layer AL6.

The first to sixth adhesive layers AL1 to AL6 may include a pressure sensitive adhesive (PSA) or an optically clear adhesive (OCA), but the type of adhesive is not necessarily limited thereto.

FIG. 4 is a cross-sectional view illustrating an electronic panel according to an embodiment of the present invention.

Referring to FIG. 4, the electronic panel EP may include a display panel DP, an input sensing unit ISP disposed on the display panel DP, and an antireflection layer RPL disposed on the input sensing unit ISP. The display panel DP may be a flexible display panel. For example, the display panel DP may include a flexible substrate and a plurality of elements disposed on the flexible substrate.

The display panel DP, according to an embodiment of the present invention, may be a light emitting type display panel and is not necessarily limited thereto. For example, the display panel DP may be an organic light emitting diode (OLED) display panel, a quantum dot display panel, a micro LED display panel, or a nano-LED display panel. A light emitting layer of the organic light emitting diode display panel may include an organic light emitting material. A light emitting layer of the quantum dot display panel may include quantum dots, quantum rods, and the like. A light emitting layer of the micro LED display panel may include a micro LED. A light emitting layer of the nano-LED display panel may include nano-LEDs. Hereinafter, a case in which the display panel DP is an organic light emitting diode display panel will be described.

The input sensing unit ISP may include a plurality of pen-sensing electrodes (shown in FIG. 8 below) for sensing the first input described above using an electromagnetic method (or an electromagnetic resonance method). The input sensing unit ISP may include a plurality of sensing electrodes (shown in FIG. 8 below) for sensing the second input described above in a capacitive manner. The input sensing unit ISP may be directly formed on the display panel DP in a manufacturing process of the electronic panel EP.

The antireflection layer RPL may be disposed on the input sensing unit ISP. The antireflection layer RPL may be directly formed on the input sensing unit ISP in the manufacturing process of the electronic panel EP. The antireflection layer RPL may be an external light antireflection film. The antireflection layer RPL may reduce reflectance of external light incident toward the display panel DP from the top of the display device DD.

As an example, the input sensing unit ISP may be directly formed on the display panel DP and the antireflection layer RPL may be directly formed on the input sensing unit ISP, but the embodiment of the present invention is not necessarily limited thereto. For example, the input sensing unit ISP may be separately manufactured and attached to the display panel DP by an adhesive layer. In addition, the antireflection layer RPL may be separately manufactured and attached to the input sensing unit ISP by an adhesive layer.

FIG. 5 is a cross-sectional view illustrating a display panel according to an embodiment of the present invention.

Referring to FIG. 5, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display area DA and a non-display area NDA at least partially surrounding the display area DA. The substrate SUB may include a flexible plastic material such as polyimide (PI).

The substrate SUB may be a base surface on which the circuit element layer DP-CL is disposed. The substrate SUB may be a glass substrate, a metal substrate, or a polymer substrate. However, embodiments are not necessarily limited thereto, and the substrate SUB may be an inorganic layer, an organic layer, or a composite material layer.

The substrate SUB may have a multi-layer structure. For example, the substrate SUB may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and/or a perylenebased resin. On the other hand, in the present specification, "~~"-based resin may mean containing a functional group of "~~", where "~~" is any given substance.

The circuit element layer DP-CL may be disposed on the substrate SUB. The circuit element layer DP-CL may include an insulating layer, a semiconductor pattern, a conductive pattern, a signal line, and the like. An insulating layer, a semiconductor layer, and a conductive layer may be formed on the substrate SUB by a coating method, a deposition method, or the like. Thereafter, the insulating layer, the semiconductor layer, and the conductive layer may be selectively patterned through a plurality of photolithography processes. After that, the semiconductor pattern, the conductive pattern, and the signal line included in the circuit element layer DP-CL may be formed.

The display element layer DP-OLED may be disposed on the circuit element layer DP-CL. The display element layer DP-OLED may be disposed on the display area DA. A plurality of pixels PX (see FIG. 6) may be disposed in the display area DA. Each of the pixels may include a light emitting element connected to a transistor disposed in the circuit element layer DP-CL and disposed in the display element layer DP-OLED.

The thin film encapsulation layer TFE may be disposed on the circuit element layer DP-CL and may cover the display element layer DP-OLED. The thin film encapsulation layer TFE may include inorganic layers and an organic layer between the inorganic layers. The inorganic layers may protect the pixels from moisture or oxygen. The organic layer may protect the pixels from foreign substances such as dust particles.

Figure 6:
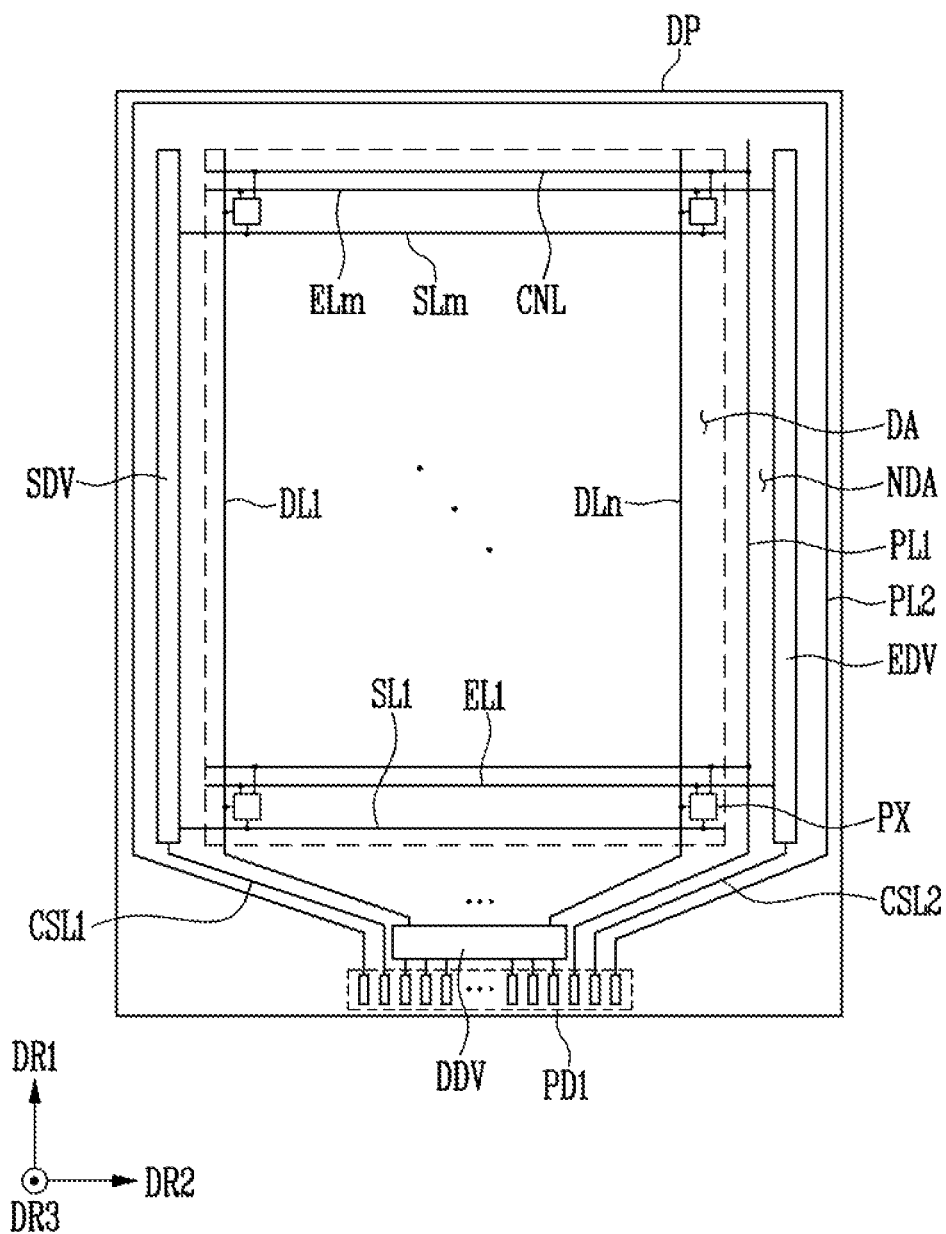
FIG. 6 is a plan view illustrating a part of the electronic panel according to an embodiment of the present invention.

FIG. 6 is a plan view illustrating a part of the electronic panel according to an embodiment of the present invention.

Referring to FIG. 6, the electronic panel EP (see FIG. 4) may include the display panel DP, a scan driver SDV, a data driver DDV, a light emission driver EDV, and a plurality of first pads PD1.

The display panel DP may have a rectangular shape having long sides extending in the first direction DR1 and short sides extending in the second direction DR2, but the shape of the display panel DP is not necessarily limited thereto. The display panel DP may include the display area DA and the non-display area NDA at least partially surrounding the display area DA.

The display panel DP may include the plurality of pixels PX, a plurality of scan lines SL1 to SLm, a plurality of data lines DL1 to DLn, a plurality of emission lines EL1 to ELm, first and second control lines CSL1 and CSL2, first and second power source lines PL1 and PL2, and connection lines CNL, where m and n may be positive integers.

The pixels PX may be disposed in the display area DA. The scan driver SDV and the light emission driver EDV may be disposed in the non-display area NDA adjacent to the long sides of the display panel DP, respectively. The data driver DDV may be disposed in the non-display area NDA adjacent to one of the short sides of the display panel DP. In a plan view, the data driver DDV may be adjacent to a lower end of the display panel DP.

The scan lines SL1 to SLm may extend in the second direction DR2 and be electrically connected to the pixels PX and the scan driver SDV. The data lines DL1 to DLn may extend in the first direction DR1 and be electrically connected to the pixels PX and the data driver DDV. The emission lines EL1 to ELm may extend in the second direction DR2 and be electrically connected to the pixels PX and the light emission driver EDV.

The first power source line PL1 may extend in the first direction DR1 and be disposed in the non-display area NDA. The first power source line PL1 may be disposed between the display area DA and the light emission driver EDV.

The connection lines CNL may extend in the second direction DR2 and be arranged in the first direction DR1 to be electrically connected to the first power source line PL1 and the pixels PX. A first voltage may be applied to the pixels PX through the first power source line PL1 and the connection lines CNL electrically connected to each other.

The second power source line PL2 may be disposed in the non-display area NDA and may extend along the long sides of the display panel DP and the other short side of the display panel DP where the data driver DDV is not disposed. The second power source line PL2 may be disposed outside the scan driver SDV and the light emission driver EDV.

The second power source line PL2 may extend toward the display area DA and be electrically connected to the pixels PX. A second voltage having a lower level than the first voltage may be applied to the pixels PX through the second power source line PL2.

The first control line CSL1 may be electrically connected to the scan driver SDV and may extend toward the lower end of the display panel DP. The second control line CSL2 may be electrically connected to the light emission driver EDV and may extend toward the lower end of the display panel DP. The data driver DDV may be disposed between the first control line CSL1 and the second control line CSL2.

The first pads PD1 may be disposed in the non-display area NDA adjacent to the lower end of the display panel DP and may be closer to the lower end of the display panel DP than the data driver DDV. The data driver DDV, the first power source line PL1, the second power source line PL2, the first control line CSL1, and the second control line CSL2 may be electrically connected to the first pads PD1. The data lines DL1 to DLn may be electrically connected to the data driver DDV, and the data driver DDV may be electrically connected to the first pads PD1 corresponding to the data lines DL1 to DLn.

The display device DD may further include a timing controller for controlling operations of the scan driver SDV, the data driver DDV, and the light emission driver EDV and a voltage generator for generating the first and second voltages. The timing controller and the voltage generator may be electrically connected to the first pads PD1 through a printed circuit board. In an embodiment, the timing controller and/or the voltage generator may be integrated with the data driver DDV.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of emission signals, and the emission signals may be applied to the pixels PX through the emission lines EL1 to ELm.

The pixels PX may receive the data voltages in response to the scan signals. The pixels PX may display an image by emitting light with a luminance corresponding to the data voltages in response to the emission signals.

Figure 7:
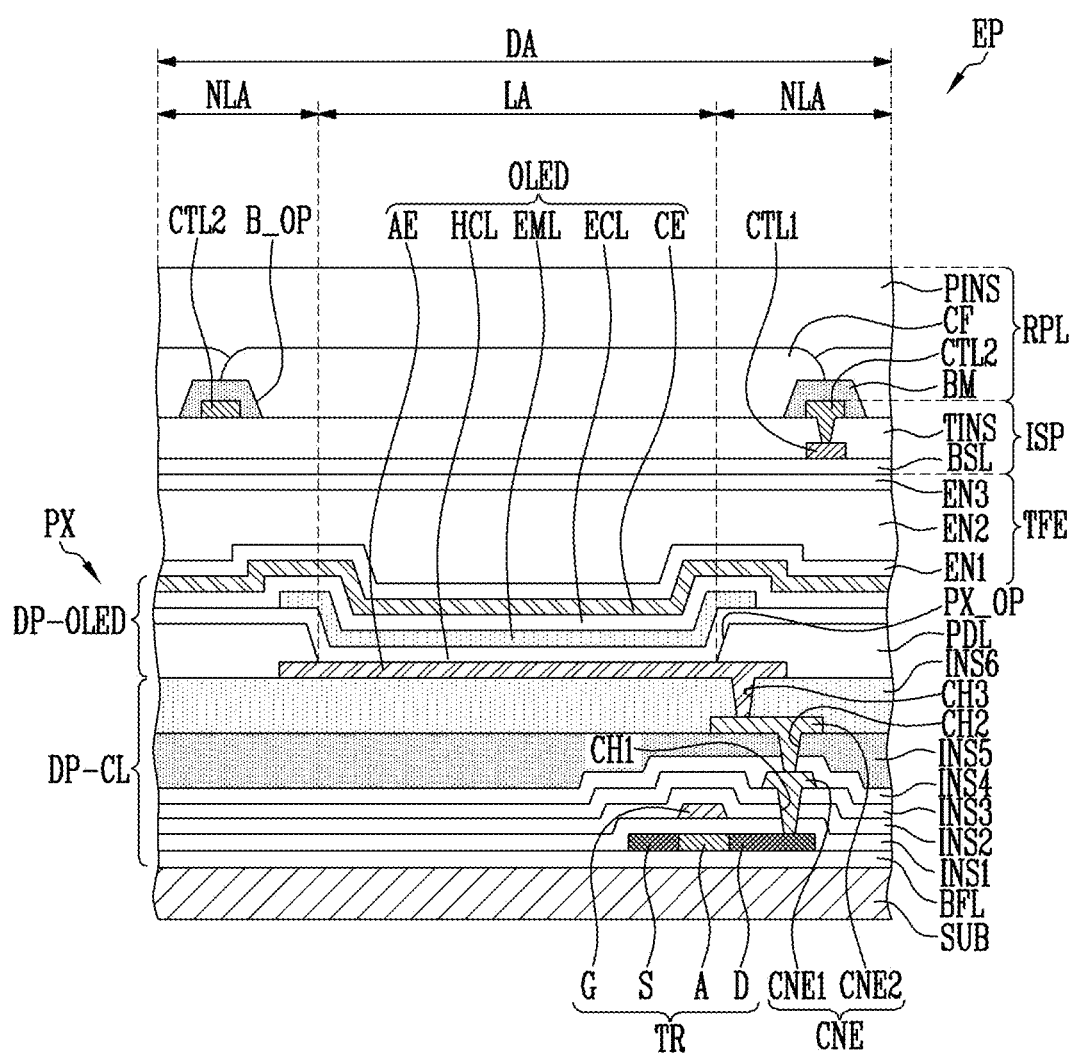
FIG. 7 is a cross-sectional view illustrating an electronic panel according to an embodiment of the present invention.

FIG. 7 is a cross-sectional view illustrating an electronic panel according to an embodiment of the present invention.

Referring to FIG. 7, a pixel PX may include a transistor TR and a light emitting element OLED. The light emitting element OLED may include a first electrode AE (or anode), a second electrode CE (or cathode), a hole control layer HCL, an electron control layer ECL, and a light emitting layer EML.

The transistor TR and the light emitting element OLED may be disposed on the substrate SUB. Although one transistor TR is shown as an example, in practice, the pixel PX may include a plurality of transistors and at least one capacitor for driving the light emitting element OLED.

The display area DA may include an emission area LA corresponding to each of the pixels PX and a non-emission area NLA at least partially surrounding the emission area LA. The light emitting element OLED may be disposed in the emission area LA.

A buffer layer BFL may be disposed on the substrate SUB, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly doped region and a low doped region. The conductivity of the highly doped region may be greater than that of the low doped region, and may substantially function as a source electrode and a drain electrode of the transistor TR. The low doped region may substantially correspond to an active region (or channel) of the transistor.

A source S, an active A, and a drain D of the transistor TR may be formed of the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may include a first connection electrode CNE1 and a second connection electrode CNE2 to connect the transistor TR and the light emitting element OLED. The first connection electrode CNE1 may be disposed on the third insulating layer INS3 and electrically connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be electrically connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL to the sixth insulating layer INS6 may be the circuit element layer DP-CL. The first insulating layer INS1 to the sixth insulating layer INS6 may be an inorganic layer or an organic layer.

The first electrode AE may be disposed on the sixth insulating layer INS6. The first electrode AE may be electrically connected to the second connection electrode CNE2 through a third contact hole CH3 defined in the sixth insulating layer INS6. A pixel defining layer PDL having an opening PX_OP for exposing a predetermined portion of the first electrode AE may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate any one of red, green, and blue light.

The electron control layer ECL may be disposed on the light emitting layer EML and the hole control layer HCL. The electron control layer ECL may include an electron transport layer and an electron injection layer. The hole control layer HCL and the electron control layer ECL may be commonly disposed in the emission area LA and the non-emission area NLA.

The second electrode CE may be disposed on the electron control layer ECL. The second electrode CE may be commonly disposed on the pixels PX. A layer on which the light emitting element OLED is disposed may be the display element layer DP-OLED.

The thin film encapsulation layer TFE may be disposed on the second electrode CE and may cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture or oxygen. The second encapsulation layer EN2 may include an organic insulating layer and may protect the pixel PX from foreign substances such as dust particles.

The first voltage may be applied to the first electrode AE through the transistor TR, and the second voltage having a lower level than the first voltage may be applied to the second electrode CE. Holes and electrons injected into the light emitting layer EML may combine with each other to form excitons, and the light emitting element OLED may emit light while the excitons transition to a ground state.

The input sensing unit ISP may be disposed on the thin film encapsulation layer TFE. The input sensing unit ISP may be directly manufactured on an upper surface of the thin film encapsulation layer TFE.

A base layer BSL may be disposed on the thin film encapsulation layer TFE. The base layer BSL may include an inorganic insulating layer. At least one inorganic insulating layer may be provided on the thin film encapsulation layer TFE as the base layer BSL.

The input sensing unit ISP may include a first conductive pattern CTL1 and a second conductive pattern CTL2 disposed on the first conductive pattern CTL1. The first conductive pattern CTL1 may be disposed on the base layer BSL. An insulating layer TINS may be disposed on the base layer BSL and may cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emission area NLA. The first and second conductive patterns CTL1 and CTL2 may be disposed on the non-emission area NLA between emission areas LA and have a mesh shape.

The first and second conductive patterns CTL1 and CTL2 may form the sensing electrodes and the pen-sensing electrodes of the input sensing unit ISP. For example, the first and second conductive patterns CTL1 and CTL2 having the mesh shape may be separated from each other in a predetermined area to form the sensing electrodes and the pen-sensing electrodes. A portion of the second conductive pattern CTL2 may be electrically connected to the first conductive pattern CTL1.

The antireflection layer RPL may be disposed on the second conductive pattern CTL2. The antireflection layer RPL may include a black matrix BM and a plurality of color filters CF. The black matrix BM may overlap the non-emission area NLA, and the color filters CF may overlap the emission areas LA, respectively.

The black matrix BM may be disposed on the insulating layer TINS and may cover the second conductive pattern CTL2. An opening B_OP overlapping the emission area LA and the opening PX_OP may be defined in the black matrix BM. The black matrix BM may absorb and block light. The width of the opening B_OP may be greater than that of the opening PX_OP. In an embodiment, the antireflection layer RPL may be used instead of the black matrix BM by overlapping other types of color filters CF.

The color filters CF may be disposed on the insulating layer TINS and the black matrix BM. The color filters CF may be disposed in openings B_OP, respectively. A planarization insulating layer PINS may be disposed on the color filters CF. The planarization insulating layer PINS may provide a flat upper surface. The planarization insulating layer PINS may include an organic insulating layer.

When external light incident toward the display panel DP is reflected by the display panel DP like a mirror and is reflected back to the user again, the user may visually recognize the external light. To prevent this phenomenon, as an example, the antireflection layer RPL may include a plurality of color filters CF having the same color as the pixels PX of the display panel DP. The color filters CF may filter the external light into the same colors as the pixels PX. In this case, the external light might not be visually recognized by the user.

Figure 8:
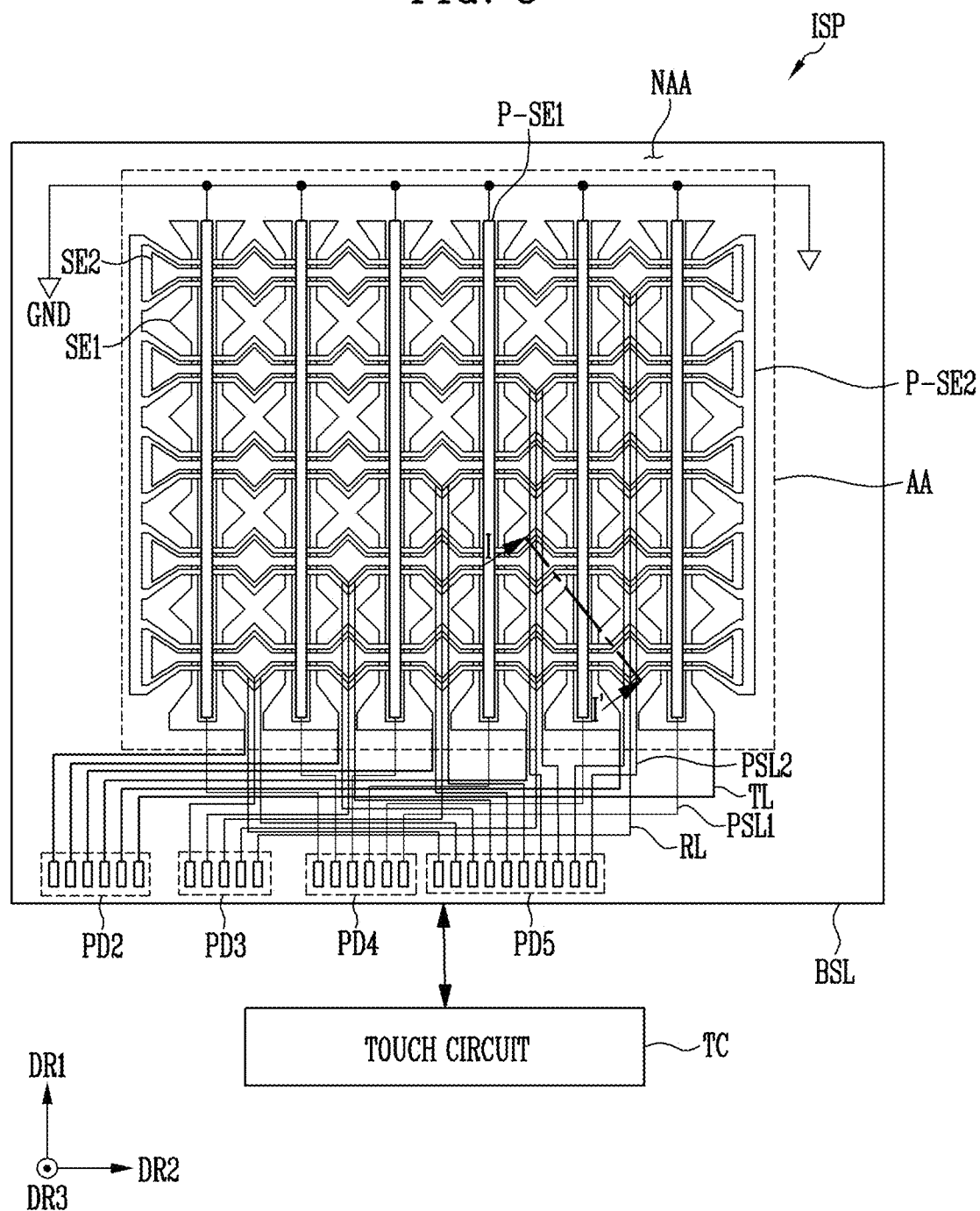
FIG. 8 is a plan view illustrating an input sensing unit according to an embodiment of the present invention.
Figure 9:
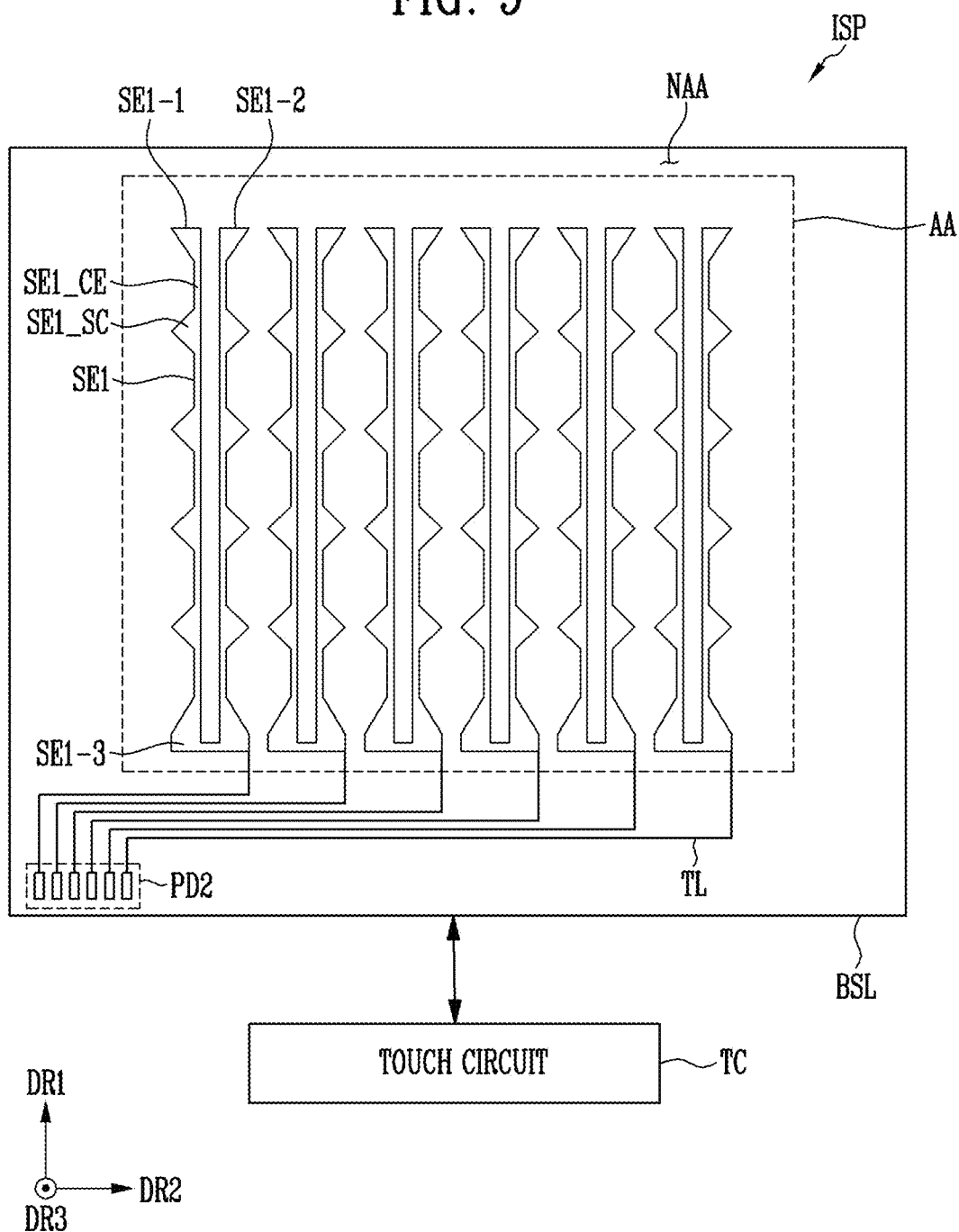
FIG. 9 is a plan view illustrating an example of a first sensing electrode and a first sensing line of the input sensing unit of FIG. 8.
Figure 10:
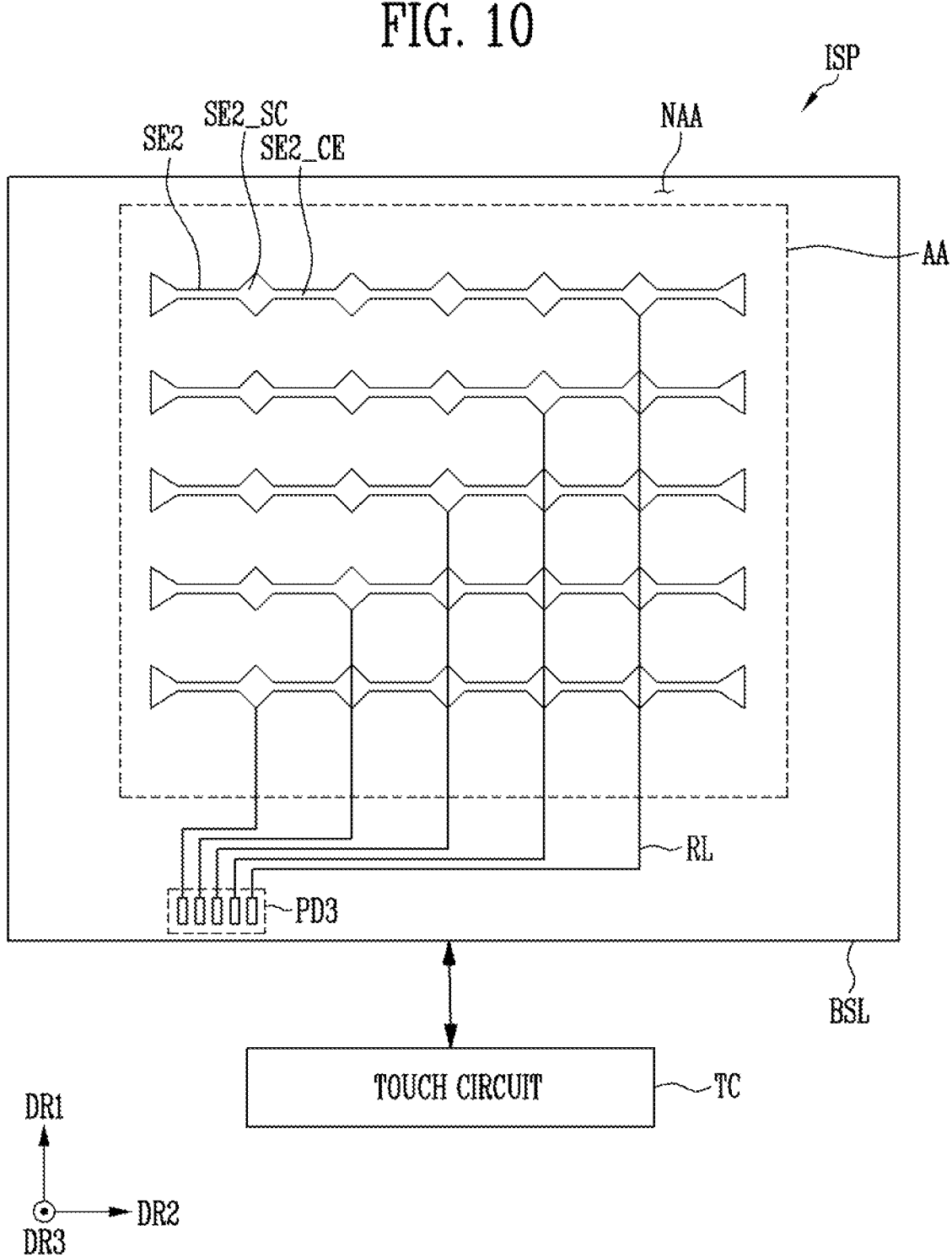
FIG. 10 is a plan view illustrating an example of a second sensing electrode and a second sensing line of the input sensing unit of FIG. 8.
Figure 11:
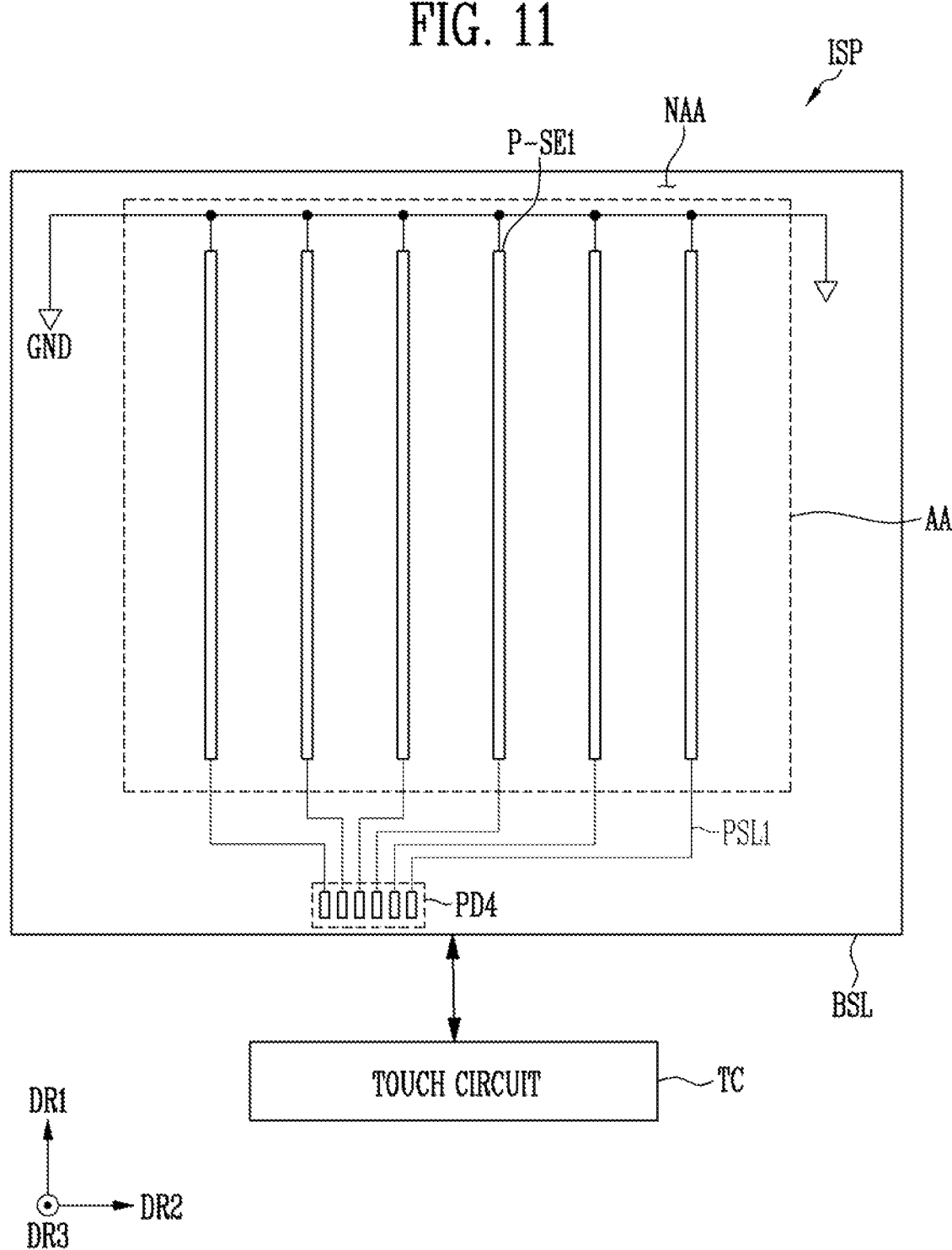
FIG. 11 is a plan view illustrating an example of a first pen-sensing electrode and a first pen-sensing line of the input sensing unit of FIG. 8.
Figure 12:
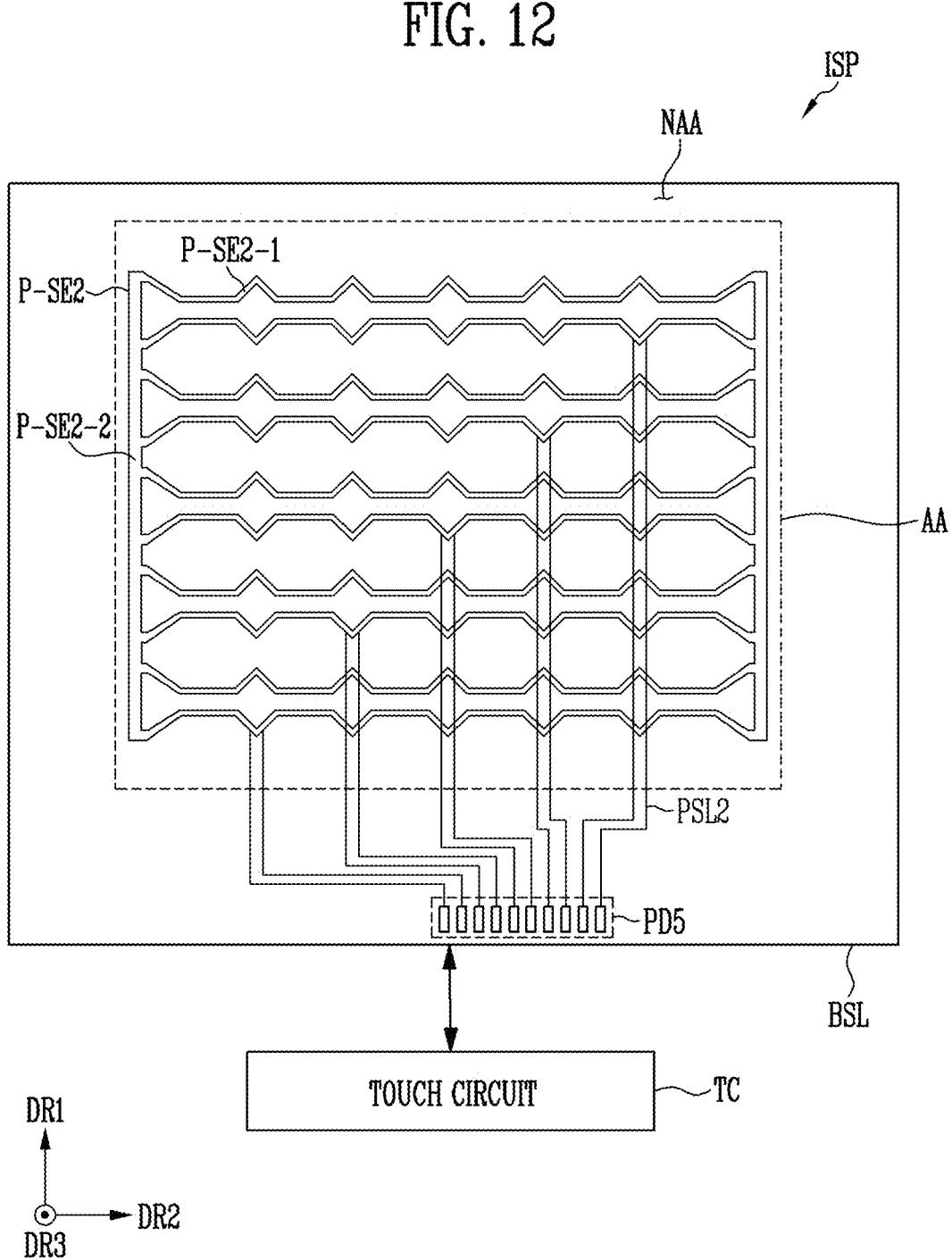
FIG. 12 is a plan view illustrating an example of a second pen-sensing electrode and a second pen-sensing line of the input sensing unit of FIG. 8.
Figure 13:
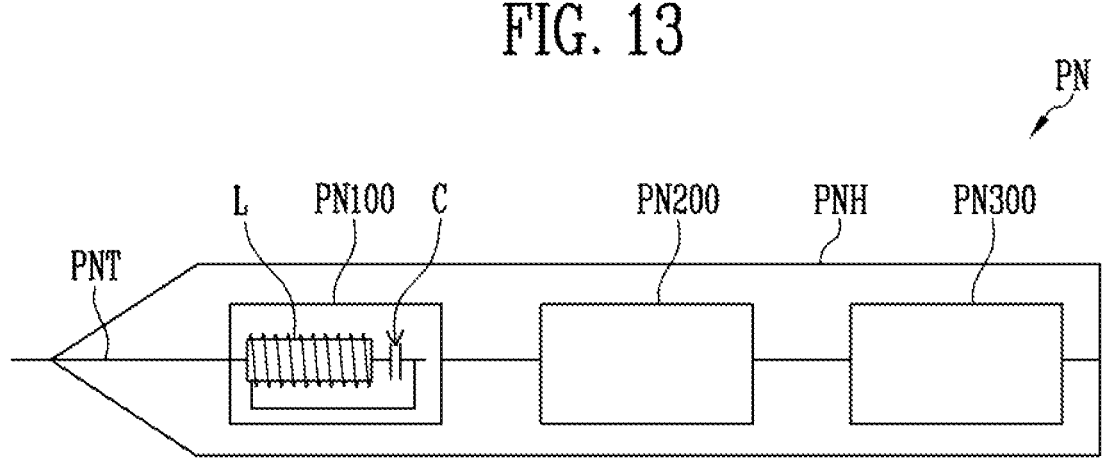
FIG. 13 is a block diagram illustrating an input device according to an embodiment of the present invention.

FIG. 8 is a plan view illustrating an input sensing unit according to an embodiment of the present invention. FIG. 9 is a plan view illustrating an example of a first sensing electrode and a first sensing line of the input sensing unit of FIG. 8. FIG. 10 is a plan view illustrating an example of a second sensing electrode and a second sensing line of the input sensing unit of FIG. 8. FIG. 11 is a plan view illustrating an example of a first pen-sensing electrode and a first pen-sensing line of the input sensing unit of FIG. 8. FIG. 12 is a plan view illustrating an example of a second pen-sensing electrode and a second pen-sensing line of the input sensing unit of FIG. 8. FIG. 13 is a block diagram illustrating an input device according to an embodiment of the present invention.

Referring to FIGS. 8 to 12, the display device may include the input sensing unit ISP and a touch circuit TC driving the input sensing unit ISP.

The input sensing unit ISP may include the base layer BSL, sensing electrodes SE1, SE2, P-SE1, and P-SE2, lines TL, RL, PSL1, and PSL2 electrically connected to the sensing electrodes SE1, SE2, P-SE1, and P-SE2, and pads PD2, PD3, PD4, and PD5 electrically connecting the lines TL, RL, PSL1, and PSL2 to the touch circuit TC.

An active area AA and a peripheral area NAA adjacent to the active area AA may be defined in the base layer BSL. In a plan view, the active area AA may overlap the display area DA (see FIG. 6), and the peripheral area NAA may overlap the non-display area NDA (see FIG. 6).

The sensing electrodes SE1, SE2, P-SE1, and P-SE2 may be disposed in the active area AA, and second to fifth pads PD2, PD3, PD4, and PD5 may be disposed in the peripheral area NAA. The second to fifth pads PD2, PD3, PD4, and PD5 may be adjacent to a lower end of the input sensing unit ISP in a plan view. However, the present invention is not necessarily limited to the positions of the second to fifth pads PD2, PD3, PD4, and PD5.

Referring to FIGS. 8 and 9, a first sensing electrode SE1 may extend in the first direction DR1 and be arranged in the second direction DR2. The first sensing electrode SE1 may include a sensing cell SE1_SC and a connection electrode SE1_CE. The sensing cell SE1_SC may have a larger area than the connection electrode SE1_CE. The touch circuit TC may calculate coordinates of the first and second inputs based on the sensing cell SE1_SC. The connection electrode SE1_CE may connect sensing cells SE1_SC. The connection electrode SE1_CE of the first sensing electrode SE1 may include a connection pattern having a bridge shape.

The first sensing electrode SE1 may include a first portion SE1-1 extending in the first direction DR1. The first sensing electrode SE1 may include a second portion SE1-2 spaced apart from the first portion SE1-1 and extending in the first direction DR1. The first sensing electrode SE1 may include a third portion SE1-3 electrically connecting the first portion SE1-1 and the second portion SE1-2. A first pen-sensing electrode P-SE1 may be disposed between the first portion SE1-1 and the second portion SE1-2.

The first sensing line TL may electrically connect the first sensing electrode SE1 to the second pad PD2. The second pad PD2 may be electrically connected to the touch circuit TC.

Referring to FIGS. 8 and 10, a second sensing electrode SE2 may extend in the second direction DR2 crossing the first direction DR1 and be arranged in the first direction DR1. The second sensing electrode SE2 may include a sensing cell SE2_SC and a connection electrode SE2_CE. The sensing cell SE2_SC may have a larger area than the connection electrode SE2_CE. The touch circuit TC may calculate coordinates of the first and second inputs based on the sensing cell SE2_SC. The connection electrode SE2_CE may connect sensing cells SE2_SC. The connection electrode SE2_CE of the second sensing electrode SE2 may include a connection pattern having a bridge shape.

A second sensing line RL may electrically connect the second sensing electrode SE2 to the third pad PD3. The third pad PD3 may be electrically connected to the touch circuit TC.

The second sensing line RL may be electrically connected to the second sensing electrode SE2 via the active area AA. For example, the second sensing line RL may be electrically connected to the second sensing electrode SE2 in the active area AA and may extend in the first direction DR1 in the active area AA. For example, the second sensing line RL may overlap at least portions of the sensing electrodes SE1, SE2, P-SE1, and P-SE2. For example, each of the second sensing lines RL may be electrically connected to the sensing cell SE2_SC of the second sensing electrode SE2 in a different row.

When the second sensing line RL is electrically connected to one end of the second sensing electrode SE2 via the peripheral area NAA, the peripheral area NAA for the second sensing line RL may be required. For example, as the second sensing line RL is electrically connected to the second sensing electrode SE2 via the active area AA, dead space may be reduced.

Referring to FIGS. 8 and 11, the first pen-sensing electrode P-SE1 may extend in the first direction DR1 and be arranged in the second direction DR2. First pen-sensing electrodes P-SE1 may be electrically connected to each other. For example, one end of each of the first pen-sensing electrodes P-SE1 may be electrically connected to ground GND.

In an embodiment, at least one of the first pen-sensing electrodes P-SE1 may be disposed in the peripheral area NAA. In this case, charging sensitivity and sensing reliability of the input device that inputs the first input to the active area AA adjacent to the peripheral area NAA can be improved.

A first pen-sensing line PSL may electrically connect the first pen-sensing electrode P-SE1 to the fourth pad PD4. The fourth pad PD4 may be electrically connected to the touch circuit TC.

Referring to FIGS. 8 and 12, a second pen-sensing electrode P-SE2 may at least partially surround the second sensing electrode SE2. The second pen-sensing electrode P-SE2 may include first portions P-SE2-1 extending in the second direction DR2 and second portions P-SE2-2 extending in the first direction DR1 crossing the second direction DR2 and electrically connecting the first portions P-SE2-1 at both ends of the first portions P-SE2-1. For example, the first portions P-SE2-1 may extend in the second direction DR2 crossing the first direction DR1 and be arranged in the first direction DR1.

A second pen-sensing line PSL2 may electrically connect the second sensing electrode SE2 to the fifth pad PD5. The fifth pad PD5 may be electrically connected to the touch circuit TC.

The second pen-sensing line PSL2 may be electrically connected to the second pen-sensing electrode P-SE2 via the active area AA. For example, the second pen-sensing line PSL2 may be electrically connected to the second pen-sensing electrode P-SE2 in the active area AA and may extend in the first direction DR1 in the active area AA. For example, the second pen-sensing line PSL2 may overlap at least portions of the sensing electrodes SE1, SE2, P-SE1, and P-SE2. For example, second pen-sensing lines PSL2 may be electrically connected to the first portions P-SE2-1 of the second pen-sensing electrode P-SE2 in a different row.

When the second pen-sensing line PSL2 is electrically connected to one end of the second pen-sensing electrode P-SE2 via the peripheral area NAA, the peripheral area NAA for the second pen-sensing line PSL2 may be required. For example, since the second pen-sensing line PSL2 is electrically connected to the second pen-sensing electrode P-SE2 via the active area AA, dead space can be reduced.

Referring to FIGS. 8, 10, and 12, at least two of the second pen-sensing lines PSL2 may be electrically connected to one of the first portions P-SE2-1 of the second pen-sensing electrode P-SE2. The second sensing line RL may be disposed between the at least two of the second pen-sensing lines PSL2 in the active area AA. Accordingly, coupling between the conductive pattern forming the second sensing line RL and the conductive pattern forming the first sensing electrode SE1 can be minimized. A detailed description of this will be described later.

In the present embodiment, a case in which each of the second pen-sensing lines PSL2 is electrically connected to different fifth pads PD5 is shown as an example, but the present invention is not necessarily limited thereto. For example, the second pen-sensing lines PSL2 electrically connected to the first portion P-SE2-1 of the same second pen-sensing electrode P-SE2 may be electrically connected to the same fifth pad PD5.

Referring to FIGS. 8 to 13, for example, the input sensing unit ISP may be driven in time division and driven in a first sensing period and a second sensing period. The first sensing period and the second sensing period may be repeated.

During the first sensing period, the first and second sensing electrodes SE1 and SE2 are driven so that the second input by a user's touch can be sensed. For example, in the first sensing period, the input sensing unit ISP may be driven in a mutual capacitance method. For example, in the first sensing period, the touch circuit TC may output a first touch driving signal to the first sensing electrode SE1 and receive a first touch sensing signal from the second sensing electrode SE2. A capacitance may be formed between the first sensing electrode SE1 and the second sensing electrode SE2. When the second input is input to the input sensing unit ISP, the capacitance may vary. The touch circuit TC may sense the second input based on the capacitance change.

During the second sensing period, the first input by the input device PN may be sensed by the first and second pen-sensing electrodes P-SE1 and P-SE2. The input device PN may include a housing PNH, a pen tip PNT, a resonance circuit unit PN100, a control unit PN200, and a power source unit PN300.

The housing PNH may have a pen shape. An accommodation space may be formed inside the housing PNH. The resonance circuit unit PN100, the control unit PN200, and the power source unit PN300 may be accommodated in the accommodating space defined inside the housing PNH.

The pen tip PNT may be disposed at an end of the housing PNH. For example, a portion of the pen tip PNT may be exposed to the outside of the housing PNH, and the remaining portion of the pen tip PNT may be inserted into the housing PNH.

The resonance circuit unit PN100 may be a component that generates a signal. The resonant circuit unit PN100 may include an integrated circuit or an oscillator for a specific purpose. The resonance circuit unit PN100 may output an AC signal having a frequency of a predetermined value.

The resonance circuit unit PN100 may include an inductor L and a capacitor C electrically connected to the inductor L. An LC resonance circuit may be formed by the inductor L and the capacitor C. The capacitor C may be a variable capacitor having a variable capacitance. The input device PN may be disposed on the display device DD, and the capacitor C may be charged during a charging period.

An induced current from the display device DD may be generated in the resonance circuit unit PN100, and a magnetic field may be generated by resonating with the induced current.

The power source unit PN300 may supply a power source to the control unit PN200. The power source unit PN300 may include a battery, a high-capacity capacitor, or the like. However, this is only an example, and the power source unit PN300 according to an embodiment of the present invention may be omitted.

The second sensing period may include a charging period and a pen-sensing period following the charging period. During the charging period, the first pen-sensing electrodes P-SE1 may be sequentially driven to form a coil.

In the charging period, the touch circuit TC may apply a second touch driving signal to the first pen-sensing electrodes P-SE1 in a predetermined order. Magnetic flux may be generated by the current flowing through the pen-sensing electrodes P-SE1. The magnetic flux may flow into a ferrite core surrounding the coil of the inductor L of the input device PN. In this case, an induced current may be generated in the coil of the inductor L. Charge may be charged in the capacitor C by the induced current.

In the charging period, the touch circuit TC may apply a third touch driving signal to the second pen-sensing electrodes P-SE2. During the charging period, the capacitor between the first pen-sensing electrode P-SE1 and the first sensing electrode SE1 may be charged, and the capacitor between the second pen-sensing electrode P-SE2 and the second sensing electrode SE2 may be charged.

In the pen-sensing period, when the input device PN in which the capacitor C is charged approaches the input sensing unit ISP, the capacitance between the first sensing electrode SE1 and the first pen-sensing electrode P-SE1 and the capacitance between the second sensing electrode SE2 and the second pen-sensing electrode P-SE2 may be changed. The touch circuit TC may sense the first input from the capacitance change.

However, the present invention is not necessarily limited to a method of sensing the first input and the second input from the sensing electrodes SE1, SE2, P-SE1, and PSE2.

Figure 14:
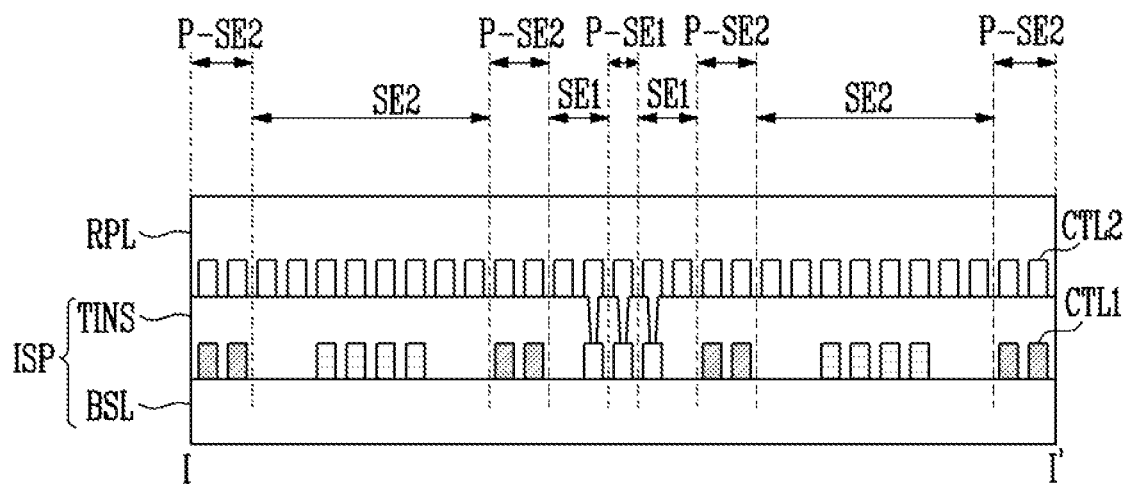
FIG. 14 is a cross-sectional view illustrating an example of a cross section taken along line I-I' of FIG. 8.

FIG. 14 is a cross-sectional view illustrating an example of a cross section taken along line I-I' of FIG. 8.

Referring to FIGS. 8 and 14, the first sensing electrode SE1 may be formed of the second conductive pattern CTL2. A portion of the second conductive pattern CTL2 forming the first sensing electrode SE1 may be electrically connected to the first conductive pattern CTL1 to form a connection pattern having a bridge shape.

The second sensing electrode SE2 may be formed of the second conductive pattern CTL2. In the active area AA, the second sensing line RL may be formed of the first conductive pattern CTL1. The first conductive pattern CTL1 forming the second sensing line RL may be electrically connected to the second conductive pattern CTL2 forming the second sensing electrode SE2 in the active area AA.

The first pen-sensing electrode P-SE1 may be formed of the second conductive pattern CTL2. A portion of the second conductive pattern CTL2 forming the first pen-sensing electrode SE1 may be electrically connected to the first conductive pattern CTL1 to form a connection pattern having a bridge shape.

The second pen-sensing electrode P-SE2 may be formed of the second conductive pattern CTL2. In the active area AA, the second pen-sensing line PSL2 may be formed of the first conductive pattern CTL1. The first conductive pattern CTL1 forming the second pen-sensing line PSL2 may be electrically connected to the second conductive pattern CTL2 forming the second pen-sensing electrode P-SE2 in the active area AA.

The input sensing unit ISP may include the second pen-sensing line PSL2 disposed between the first sensing electrode SE1 and the second sensing line RL in the active area AA. For example, the second conductive pattern CTL2 forming the second pen-sensing electrode P-SE2 and the second conductive pattern CTL2 forming the second pen-sensing line PSL2 may be disposed between the second conductive pattern CTL2 forming the first sensing electrode SE1 and the first conductive pattern CTL1 forming the second sensing line RL.

An electric field may be formed between the second conductive pattern CTL2 forming the second pen-sensing electrode P-SE2 and the second conductive pattern CL2 forming the second pen-sensing line PSL2. Also, the electric field may minimize coupling between the second conductive pattern CTL2 forming the first sensing electrode SE1 and the first conductive pattern CTL1 forming the second sensing line RL.

Figure 15:
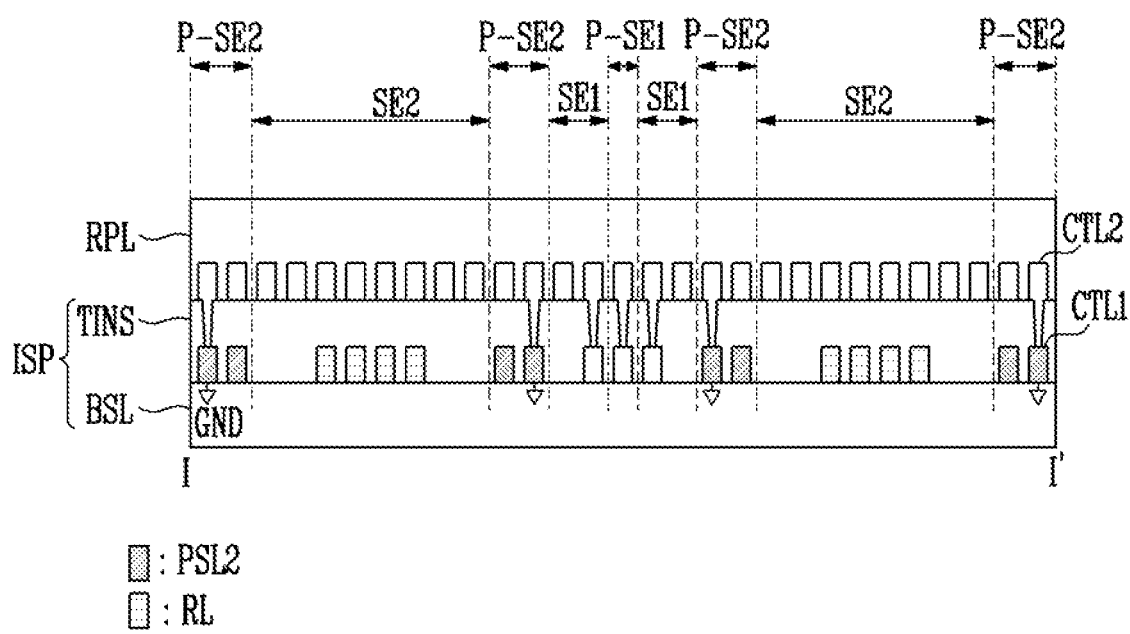
FIG. 15 is a cross-sectional view illustrating an example of a cross section taken along line I-I' of FIG. 8.

FIG. 15 is a cross-sectional view illustrating an example of a cross section taken along line I-I' of FIG. 8.

The input sensing unit ISP according to the present embodiments may have substantially the same configuration as the input sensing unit ISP of FIG. 14 except for the first conductive pattern CTL1. Therefore, the same reference numerals and reference symbols may be used for the same or similar components, and to the extent that an element is not described herein, it may be understood to be at least similar to corresponding elements that have been described elsewhere within the instant disclosure.

Referring to FIG. 15, at least one of second conductive patterns CTL2 forming the second pen-sensing electrode P-SE2 may be electrically connected to ground GND.

An electric field formed between the first conductive pattern CTL1 and the second conductive pattern CTL2 electrically connected to ground GND may be stronger than when not electrically connected to ground GND. Accordingly, an effect of blocking the coupling between the second conductive pattern CTL2 forming the first sensing electrode SE1 and the first conductive pattern CTL1 forming the second sensing line RL may be further stronger.

In an embodiment, some of the second conductive patterns CTL2 forming the second pen-sensing electrode P-SE2 adjacent to the first sensing electrode SE1 may be electrically connected to ground GND.

For example, some of the second conductive patterns CTL2 forming the second pen-sensing electrode P-SE2 adjacent to the first sensing electrode SE1 may be electrically connected to the first conductive pattern CTL1 disposed thereunder. Also, the first conductive pattern CTL1 disposed thereunder may be electrically connected to ground GND.

For example, some of first conductive patterns CTL1 forming the second pen-sensing line PSL2 may be electrically connected to ground GND. The first conductive patterns CTL1 electrically connected to ground GND may be electrically connected to the second conductive patterns CTL2 forming the second pen-sensing electrode P-SE2.

In the input sensing unit according to the embodiments of the present invention, the second pen-sensing line may be disposed between the first sensing electrode and the second sensing line in the active area. Therefore, coupling between the conductive pattern forming the first sensing electrode (or the first sensing line) and the conductive pattern forming the second sensing electrode (or the second sensing line) can be minimized. As the coupling is minimized as described above, sensing reliability of the input device can be improved.

However, the effects of the present invention are not necessarily limited to the above-described effects, and may be variously extended within a range that does not deviate from the spirit and scope of the present invention.

The embodiments of the present invention may be applied to a display device and an electronic device including the display device. For example, the present invention may be applied to digital TVs, 3D TVs, mobile phones, smart phones, tablet computers, VR devices, PCs, household electronic devices, notebook computers, PDAs, PMPs, digital cameras, music players, portable game consoles, navigation devices, and the like.

Although described with reference to the above embodiments, it will be understood that those skilled in the art can variously modify and change the disclosure without departing from the spirit and scope of the disclosure.

What is claimed is:

1. An input sensing unit, comprising:
 a base layer including an active area and a peripheral area adjacent to the active area;

an insulating layer disposed on the base layer;
sensing electrodes disposed in the active area of the base layer; and
lines disposed on the base layer, the lines being electrically connected to the sensing electrodes,
wherein the sensing electrodes include:
a first sensing electrode;
a second sensing electrode crossing the first sensing electrode;
a first pen-sensing electrode adjacent to the first sensing electrode and crossing the second sensing electrode; and
a second pen-sensing electrode adjacent to the second sensing electrode and crossing the first sensing electrode,
wherein the lines include:
a first sensing line electrically connected to the first sensing electrode;
a second sensing line electrically connected to the second sensing electrode via the active area;
a first pen-sensing line electrically connected to the first pen-sensing electrode; and
a second pen-sensing line electrically connected to the second pen-sensing electrode via the active area and disposed in the active area, between the first sensing electrode and the second sensing line.

2. The input sensing unit of claim 1, wherein a conductive pattern forming the second pen-sensing electrode and a conductive pattern forming the second pen-sensing line are disposed between a conductive pattern forming the first sensing electrode and a conductive pattern forming the second sensing line.

3. The input sensing unit of claim 1, wherein at least one of conductive patterns forming the second pen-sensing electrode are electrically connected to ground.

4. The input sensing unit of claim 3, wherein some of the conductive patterns forming the second pen-sensing electrode adjacent to the first sensing electrode are electrically connected to ground.

5. The input sensing unit of claim 1, wherein the first sensing electrode includes a first portion extending in a first direction, a second portion spaced apart from the first portion of the first sensing electrode and extending in the first direction, and a third portion electrically connecting the first portion of the first sensing electrode to the second portion of the first sensing electrode.

6. The input sensing unit of claim 5, wherein the first pen-sensing electrode is disposed between the first portion of the first sensing electrode and the second portion of the first sensing electrode.

7. The input sensing unit of claim 1, wherein the sensing electrodes include first pen-sensing electrodes that include the first pen-sensing electrode, and
wherein the first pen-sensing electrodes are electrically connected to each other.

8. The input sensing unit of claim 7, wherein one end of each of the first pen-sensing electrodes is electrically connected to ground.

9. The input sensing unit of claim 1, wherein the second sensing electrode extends in a second direction crossing a first direction, and wherein the second sensing line is electrically connected to the second sensing electrode in the active area and extends in the first direction in the active area.

10. The input sensing unit of claim 1, wherein the second pen-sensing electrode at least partially surrounds the second sensing electrode.

11. The input sensing unit of claim 1, wherein the second pen-sensing electrode includes first portions extending in a second direction, crossing a first direction, and second portions extending in the first direction and electrically connecting the first portions at both ends of the first portions.

12. The input sensing unit of claim 11, wherein the lines further include second pen-sensing lines including the second pen-sensing line, and
wherein at least two of the second pen-sensing lines are electrically connected to one of the first portions of the second pen-sensing electrode.

13. The input sensing unit of claim 12, wherein the second sensing line is disposed between at least two of the second pen-sensing lines in the active area.

14. A display device, comprising:
a display panel; and
an input sensing unit disposed on the display panel and including an active area and a peripheral area adjacent to the active area,
wherein the input sensing unit includes:
a base layer;
an insulating layer disposed on the base layer;
sensing electrodes disposed in the active area of the base layer; and
lines disposed on the base layer and electrically connected to the sensing electrodes,
wherein the sensing electrodes include:
a first sensing electrode;
a second sensing electrode crossing the first sensing electrode;
a first pen-sensing electrode adjacent to the first sensing electrode and crossing the second sensing electrode; and
a second pen-sensing electrode adjacent to the second sensing electrode and crossing the first sensing electrode,
wherein the lines include:
a first sensing line electrically connected to the first sensing electrode;
a second sensing line electrically connected to the second sensing electrode via the active area;
a first pen-sensing line electrically connected to the first pen-sensing electrode; and
a second pen-sensing line electrically connected to the second pen-sensing electrode via the active area and disposed between the first sensing electrode and the second sensing line in the active area.

15. The display device of claim 14, wherein a conductive pattern forming the second pen-sensing electrode and a conductive pattern forming the second pen-sensing line are disposed between a conductive pattern forming the first sensing electrode and a conductive pattern forming the second sensing line.

16. The display device of claim 14, wherein at least one of conductive patterns forming the second pen-sensing electrode is electrically connected to ground.

17. The display device of claim 16, wherein some of the conductive patterns forming the second pen-sensing electrode adjacent to the first sensing electrode are electrically connected to ground.

18. The display device of claim 14, wherein the first sensing electrode includes a first portion extending in a first direction, a second portion spaced apart from the first portion of the first sensing electrode and extending in the first direction, and a third portion electrically connecting the first portion of the first sensing electrode to the second portion of the first sensing electrode, and
   wherein the first pen-sensing electrode is disposed between the first portion of the first sensing electrode and the second portion of the first sensing electrode.

19. The display device of claim 14, wherein the sensing electrodes include first pen-sensing electrodes including the first pen-sensing electrode,
   wherein the first pen-sensing electrodes are electrically connected to each other, and
   wherein one end of each of the first pen-sensing electrodes is electrically connected to ground.

20. The display device of claim 14, wherein the second pen-sensing electrode includes first portions extending in a second direction, crossing a first direction, and second portions extending in the first direction and electrically connecting the first portions at both ends of the first portions,
   wherein the lines further include second pen-sensing lines including the second pen-sensing line,
   wherein at least two of the second pen-sensing lines are connected to one of the first portions of the second pen-sensing electrode, and
   wherein the second sensing line is disposed between at least two of the second pen-sensing lines in the active area.

\* \* \* \* \*